(12) United States Patent
Holliday

(10) Patent No.: US 7,511,459 B2
(45) Date of Patent: Mar. 31, 2009

(54) CONTROLLER COMPUTING A VIRTUAL TUNING CAPACITOR FOR CONTROLLING A FREE-PISTON STIRLING ENGINE DRIVING A LINEAR ALTERNATOR

(75) Inventor: Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 126 days.

(21) Appl. No.: 11/760,842

(22) Filed: Jun. 11, 2007

(65) Prior Publication Data

US 2008/0303289 A1 Dec. 11, 2008

(51) Int. Cl.
*H02H 7/06* (2006.01)
*H02P 9/00* (2006.01)

(52) U.S. Cl. ....................................... 322/24
(58) Field of Classification Search ............... 322/24
See application file for complete search history.

(56) References Cited

U.S. PATENT DOCUMENTS

| | | | | |
|---|---|---|---|---|
| 3,268,834 A * | 8/1966 | Bradmiller et al. | ...... | 331/113 R |
| 3,375,463 A * | 3/1968 | Madsen | ........... | 331/17 |
| 6,781,929 B2 * | 8/2004 | Kadlec | ........... | 369/44.28 |
| 6,871,495 B2 | 11/2004 | Lynch et al. | ........... | 60/522 |
| 6,969,941 B1 * | 11/2005 | Kapps et al. | ........... | 310/316.01 |
| 2002/0145950 A1 * | 10/2002 | Kadlec | ........... | 369/30.17 |
| 2003/0165091 A1 * | 9/2003 | Kadlec | ........... | 369/44.28 |
| 2005/0253482 A1 * | 11/2005 | Kapps et al. | ........... | 310/319 |

* cited by examiner

*Primary Examiner*—Nicholas Ponomarenko
*Assistant Examiner*—Pedro J Cuevas
(74) *Attorney, Agent, or Firm*—Frank H. Foster; Kremblas, Foster, Phillips & Pollick

(57) ABSTRACT

A feedback control circuit and method for a control system used to control an electrical power generating source that comprises a free piston Stirling engine driving a linear alternator. A switching mode rectifier connects the alternator winding to an output circuit that includes an electrical energy storage means and is controlled by a pulse width modulator that controls the rectifier switching duty cycle and phase. The control system controls the pulse width modulator. The improvement computes a voltage across a virtual tuning capacitor and uses the computed voltage to control the switching mode rectifier so that the switching mode rectifier is switched in a manner that makes the alternator circuit operate as if a tuning capacitor were actually present and so that the control system controls the piston of the Stirling engine to maintain balance of the mechanical power generated by the Stirling engine and the electrical power absorbed from the engine by the alternator.

9 Claims, 8 Drawing Sheets

Fig. 1 PRIOR ART
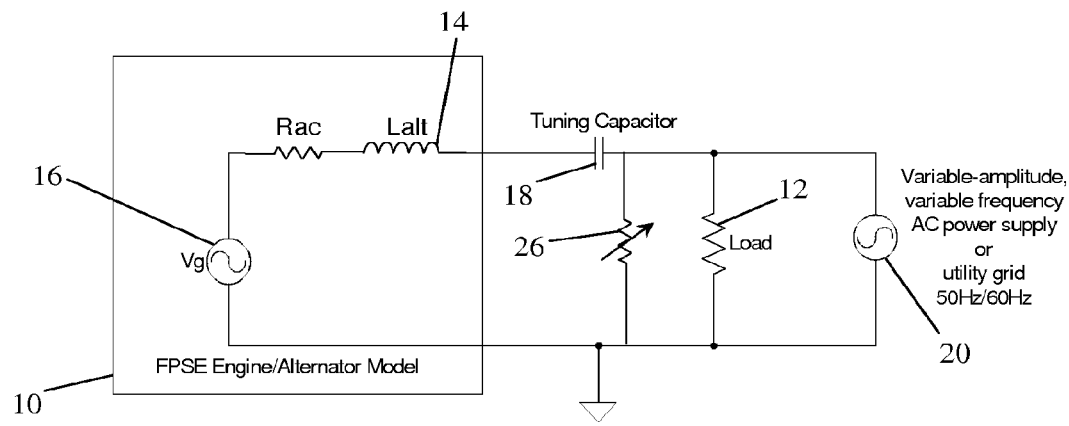
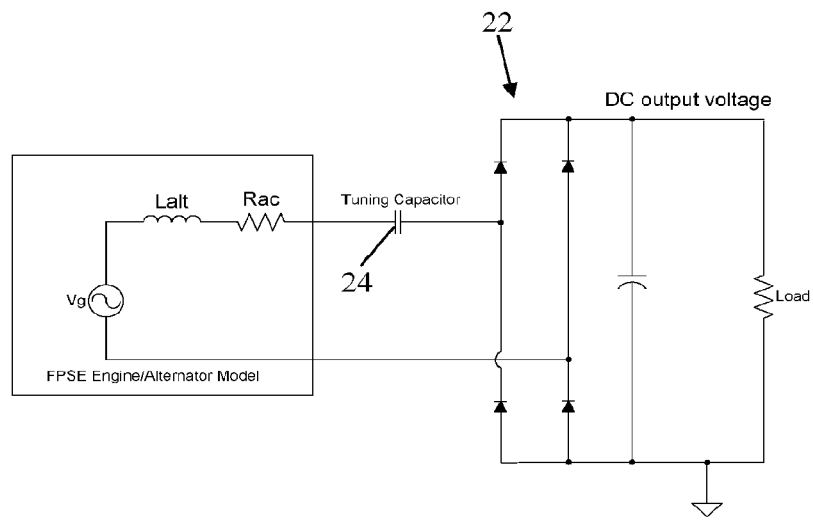
Fig. 2 PRIOR ART

CONTROLLER COMPUTING A VIRTUAL TUNING CAPACITOR FOR CONTROLLING A FREE-PISTON STIRLING ENGINE DRIVING A LINEAR ALTERNATOR

STATEMENT REGARDING FEDERALLY-SPONSORED RESEARCH AND DEVELOPMENT

This invention was made with Government support under contract w911nf-04-c-0053 awarded by Defense Advanced Research Projects Agency. The Government has certain rights in the invention.

CROSS-REFERENCES TO RELATED APPLICATIONS (Not Applicable)

REFERENCE TO AN APPENDIX (Not Applicable)

BACKGROUND OF THE INVENTION

1. Field of the Invention

This invention relates generally to a free-piston Stirling engine driving a linear alternator to generate electrical power and more particularly relates to improvements in a closed loop, negative feedback control system for such an electrical power generating source.

2. Description of the Related Art

This invention is directed to an improvement in a control system for controlling a free-piston Stirling engine driving a linear alternator for converting heat energy to electrical power. The improvements include a novel control loop for controlling piston stroke to maintain the mechanical power generated by the engine equal to the power transferred from the engine to the linear alternator and also include a control loop for controlling another variable, such as DC output voltage or head temperature. Embodiments of the invention may also be applied to control multiple such engine/alternator pairs and maintain them in synchronization.

Control Circuits

As known to those skilled in the control system art, a closed loop, negative feedback control system has a forward loop and at least one feedback loop. The forward loop has a command input that is applied to a summing point (or summing junction). The command input is a signal representing a desired (commanded) value of an operating output variable parameter that is being controlled and provides a reference signal.

The forward loop also has at least one and may have a series of forward control elements (also known as "dynamic units") that perform a mathematical operation on a signal that passes along the forward loop. Each forward control element has a forward transfer function which is a mathematical expression relating its input signal to its output signal.

A feedback loop of a closed loop, negative feedback control system has a sensor for measuring the actual value of the variable parameter that is being controlled and applies a signal representing that actual value to the summing point. The feedback loop may also perform one or more mathematical operations on the measured signal, such as scaling, before applying it to the summing point. The output of the summing point provides an error signal representing the difference between the desired value and the measured value of the controlled parameter. That error signal is applied to a forward control element.

Closed loop, negative feedback control systems are not limited to a single feedback loop, a single summing point or a single forward control element. A closed loop control system may have multiple summing points interposed between multiple forward control elements that are connected in series along the forward loop. Multiple feedback loops, each sensing and feeding back a signal representing a different sensed variable parameter, are connected to these summing points. Consequently, each summing point has an input representing a command input, an input representing a feedback signal that represents a sensed variable parameter and an output representing a difference between the inputs to the summing point. Each summing point also might have inputs representing disturbances or external force or torque loads, for example. Although the difference often represents the difference (an "error") between a commanded value of an output variable and a sensed value of the same variable, the difference can also be simply a modification of one signal by another signal described mathematically. There are also other types of circuit connections, such as a feed forward loop. Elements of a control circuit are conventionally represented in a control circuit diagram as mathematical expressions for the operations they perform on their input signals. The mathematical expressions are advantageously Laplace transform expressions and tell an engineer skilled in the art the operating characteristics of the elements in the control system and therefore how to construct hardware implementations of them. Ordinarily, there are multiple computing circuits known to those skilled in the art to implement each element in the control system so long as they perform the transfer function described by their mathematical expressions.

Persons skilled in the control system art also recognize that such control systems can be implemented with analog or digital computing circuits and combinations of them. The mathematical operations described in the diagram of a control system are desirably implemented with any of a variety of commercially available microprocessors, microcontrollers or other computing circuits. As known in the current state of the art, analog circuit and mathematical operations can be economically performed by software programmed digital circuits having software algorithms that simulate analog circuit operations and perform or compute mathematical operations. Many of these operations can be performed by discrete logic, programmable logic array (PLA), programmable gate array (PGA) or digital signal processor (DSP) implementations, as well as by microprocessors or microcontrollers. Therefore, the terms "control circuit" and "controller circuit" generically include the known types of analog and digital logic control implementations that can be used to implement the control circuit illustrated on a control circuit diagram. The term "computing circuit" refers to circuit implementations utilizing such circuits for transforming an electrical signal in accordance with a mathematical operation or algorithm.

Free-Piston Stirling Engines and Alternators

A free-piston Stirling engine (FPSE) driving a linear alternator is an attractive electrical power source because such sources are efficient, compact and light weight and can generate electrical power from heat energy supplied by a variety of fuels. A free-piston Stirling engine is a closed-cycle, reversible heat engine which converts heat into work by moving a confined volume of working gas between a relatively warmer heat acceptor and a relatively cooler heat rejector. The resulting alternating, cyclical, expansion and compression of the internal working gas provides an oscillating pressure wave that drives an appropriately sprung piston to oscillate substantially sinusoidally in linear reciprocation. The piston is mechanically linked to a ring of permanent magnets that it drives in reciprocation within the winding or coil of the linear alternator thereby inducing a voltage across the winding terminals. Typically, the piston of the engine is directly linked by a flange on the back of the piston to an array of axisymmetrically arranged magnets, for example arranged in a ring, and the engine and alternator are integrated into a common, hermetically sealed housing.

Many prior art electrical power sources of this type include a rectifier circuit connecting the alternator output terminals to an electrical load and also have a controller which is a control system for controlling the operating parameters of the Stirling engine and the alternator as well as the output electrical parameters. The operation of a free-piston Stirling engine and its connection to a linear alternator are described in many publications, including patents such as U.S. Pat. No. 6,871,495 which is herein incorporated by reference.

Energy for driving the FPSE is supplied from an external heat source, such as fuel combustion, solar energy or heat from radioisotope power sources, applying heat to the engine heat acceptor ("hot end"). The heat energy is converted by the engine to mechanical work energy which drives the linear alternator to convert the mechanical energy to electrical energy. It is highly desirable that the mechanical power generated by the FPSE be exactly equal to the power transferred from the FPSE to the linear alternator, most of which is ultimately transferred to the load. This balanced power condition avoids significant problems with engine operation. If the power transferred to the alternator exceeds the power generated by the FPSE, the engine will stall. If the power transferred to the alternator is less than the power generated by the FPSE, the piston stroke will increase uncontrollably and can cause damaging internal collisions and engine temperature will slowly increase over time. Piston stroke is the distance traveled by the piston between the boundaries of its reciprocation. Piston motion as a function of time can be represented as a phasor with a piston amplitude $X_P$ and is sometimes alternatively used to describe piston displacement. Piston amplitude $X_P$ has a magnitude of one half piston stroke and the two terms are sometimes used interchangeably when describing qualitative aspects of operation.

Fuel combustion systems for electrical power generating systems of this type commonly have temperature control systems that control the temperature at the engine's heat acceptor. Consequently, for relatively long term control, the mechanical power delivered from the engine to the alternator can be modulated by increasing or decreasing the thermal input power to the engine head which causes its temperature to change. However, that is an insufficient control for at least two reasons. First, the rate of temperature change that can be accomplished is relatively slow, far too slow to respond in time to prevent either engine stalling or piston over-stroking. Second, engine efficiency is strongly dependent upon heat acceptor temperature. The hotter the heat acceptor temperature at the engine head, the more efficient the engine. Therefore, modulating thermal input power and temperature not only is too slow but also reduces engine efficiency because it does not maintain the highest possible input head temperature. It is therefore desirable to provide a way to control engine output power in order to maintain the power transfer balance between the engine and the alternator, but it is desirable to do so in a way that permits the hot end temperature of the FPSE to remain at a constant maximum temperature in order to maximize engine efficiency. Although embodiments of the invention advantageously include a fuel combustion control system that maintains a constant temperature that is as hot as the engine materials can withstand, that alone is not a viable option for controlling engine power output and piston stroke and maintaining the power balance described above.

Prior Art Examples

FIG. 1 is a simplified schematic diagram illustrating the electrical circuit of a prior art electrical power generating source having a linear alternator 10 driven by a free-piston Stirling engine and applying the alternator AC output to a load 12. The alternator is shown as its equivalent, lumped-element circuit. This equivalent circuit has, in series connection, an inductor 14 having inductance $L_{alt}$ representing alternator winding inductance, a lumped resistance $R_{ac}$ representing alternator resistance and an AC voltage source 16 having an induced or back emf $V_g$. The voltage $V_g$ is the open circuit voltage induced in the alternator winding by the magnets that are driven in reciprocation by the free-piston Stirling engine.

A tuning capacitor 18 is frequently connected in series with the alternator winding in order to tune out the winding inductance. The capacitance of the tuning capacitor is chosen so that, at the operating frequency of the alternator and engine, the inductive reactance of the winding and the capacitive reactance of the tuning capacitor form a series resonant circuit. Such series resonant circuits exhibit a zero or resistive impedance. The tuning capacitor consequently provides a unity or near unity power factor which maximizes power transfer from the alternator to the electrical load and minimizes resistive heat losses. However, such tuning capacitors are bulky and expensive so it is desirable to eliminate the tuning capacitor. Also, the tuning capacitor impedance and the series inductor impedance only match at a single frequency. Therefore, with a tuning capacitor, the output power factor varies with engine operating frequency. The controller of the present invention can compensate over a wide range of frequencies, provide unity power factor or constant frequency operation.

As also illustrated in FIG. 1, the output of the alternator can be connected to the utility electrical power grid 20 and used to supply electrical power to the grid. As known to those skilled in the prior art, if a tuning capacitor 18 is used to balance or cancel the inductive reactance of the alternator winding, this arrangement results in the free-piston Stirling engine operating at the same frequency and substantially in phase with the electrical grid. This synchronous operation occurs because the Stirling engine is coupled to the alternator by the magnetic coupling between the reciprocating permanent magnets and the alternator winding. The coupling of the magnetic flux of the reciprocating magnets with the magnetic flux resulting from the alternator current, causes the alternator current to be reflected into the engine as complex damping forces acting upon the free-piston Stirling engine. These forces, which are reflected back into the engine, act upon the piston of the engine as a combination of mass, spring and damping forces. If a tuning capacitor is used, the magnetic force generated by the alternator current acts upon the Stirling engine piston to cause the piston to run synchronously with the alternator current in the same way that a rotating synchronous electric motor, having two rotating magnetic fields, remains synchronous. If the magnetic field from the reciprocating magnets becomes advanced or retarded from the magnetic field from the alternator current, there is a magnetic force pulling them together. In the linearly reciprocating engine and alternator, the result is that the reciprocating piston of the FPSE will operate synchronously with the electrical power grid voltage, if the FPSE is designed to be mechanically resonant at or very near the power grid frequency and the capacitor is tuned for series resonance with the alternator winding.

FIG. 2 illustrates an electrical power generating source like that of FIG. 1 and known in the prior art, but having a common, passive, full wave rectifier 22 using four diodes arranged in an H-bridge to provide a DC output. The prior art has also substituted a full wave, switching mode rectifier, also known as an active rectifier, for the full wave diode rectifier of FIG. 2 and eliminated the tuning capacitor 24 by various techniques. An example of such a configuration is shown in the above cited U.S. Pat. No. 6,871,495.

Switching Mode Rectifiers

A switching mode rectifier is a type of circuit that is known in the prior art and described in multiple publications. It typically has an H-bridge configuration but has controllable electronic switches, commonly MOSFETs, substituted for the diodes of FIG. 2. An active rectifier controller or control circuit is connected to the gate of each electronic switch and switches them ON and OFF by switching one diagonally opposite pair ON and the other pair OFF and alternating the pair that is ON while the other pair is OFF. This switching is done at a frequency that is much higher than the sinusoidal frequency of the FPSE and alternator. For example, the electronic switches may be switched at a rate of 10 kHz or 20 kHz while the FPSE and alternator may be operated at 60 Hz or 120 Hz. The switching control not only turns the electronic switches ON and OFF as described, but also varies the duty cycle of the electronic switches in response to a modulating input signal. The switching control of a switching mode rectifier is essentially a pulse width modulator that includes a high frequency oscillator for alternately switching the diagonally opposite switch pairs and also modulates the duty cycle of the ON and OFF switching states that are switched at the high frequency. The phase of the switching is a function of the phase of the signal that control the pulse width modulator and the duty cycle of the switch pairs is a function of the amplitude of that control signal. As a result, the phase of the switching of the switching mode rectifier controls the phase of the current though the H-bridge relative to the alternator terminal voltage. However, because the phase control by the switching mode rectifier does not depend upon resonance, which is frequency dependent, a switching mode rectifier can maintain a desired phase relationship over a range of engine operating frequencies. The pulse width modulating circuit and function can be implemented not only with analog circuits but also and more importantly using microprocessors or microcontrollers, as is preferred, and other digital logic and processing circuits that are programmed, such as with software, to perform the pulse width modulating function. Because switching mode rectifiers, summarized above, are described in prior art text books and technical literature about switch mode power supplies, switch mode inverters or switch mode motor drives, switching mode rectifiers are not explained here in more detail.

Variations

FIG. 1 also illustrates the use of a "dump" resistance 26 as another prior art way of controlling piston stroke and maintaining the power balance between the engine and the alternator. The resistance 26 is an additional electrical load that can be switched into the circuit or varied in resistance to essentially waste excess power produced by the engine. However, this is obviously undesirable because it simply dissipates excess power produced by the engine in order to maintain the power balance and consequently reduces efficiency by wasting heat energy and therefore wasting fuel.

The prior art has recognized that the power out from a FPSE can be controlled by controlling piston stroke because the power produced by a FPSE is approximately proportional to the square of the piston stroke. However, the voltage induced in the alternator is proportional to stroke and most electrical loads require a stable, constant voltage, such as 24 vdc or 28 vdc or 115 vac. Consequently, it is a problem to design a control system that accomplishes both (1) matching the power delivered to the alternator by the FPSE to the power demanded by the electrical load plus electrical losses; and (2) maintaining a constant output voltage. The problem is that, if the electrical power demand of the electrical load decreases and the stroke is decreased to reduce FPSE power, the induced voltage drops. Conversely, if an increased electrical power demand results in an increased stroke to provide more power from the FPSE, the output voltage also increases. It is therefore desirable to modulate the power from the FPSE to match electrical load power while reducing or eliminating voltage variations at the electrical load that result from variations in load power demand.

Additionally, there is a need for a manner of controlling piston stroke by a feedback control system that can more quickly detect variations in operating parameters resulting from system disturbances that lead to unwanted variations in piston stroke and that can quickly respond to the detected variations so that the actual piston stroke is maintained within tighter boundaries.

Similarly, there is a need for a manner of controlling piston stroke that can quickly vary the piston stroke in response to changes in the electrical power out load demand and maintain the balance of Stirling engine generated power out and power absorbed by the alternator.

Therefore, it is an object and feature of the present invention to provide an improved way of controlling piston stroke in order to match mechanical power produced by the engine to mechanical power absorbed from the engine by the alternator which is essentially the electrical power required by the user load.

A further object and feature of the invention is to control piston stroke based upon an operational parameter that can be more easily and more quickly controlled thereby permitting control of piston stroke, and therefore of power balance, within closer tolerances.

A further object and feature of the invention is to combine the piston stroke control with circuitry and a feedback control loop to provide improved voltage regulation so that the FPSE can be operated over a wide range of piston stroke for maintaining the balance of the engine power transferred to the alternator and yet still provide a relatively constant, well regulated output voltage to the electrical load over a wide range of load power consumption.

Yet another object and feature of the invention is to provide an even simpler, more stable and more effective controller for controlling an electrical power generating source comprising a free piston Stirling engine driving a linear alternator than previously disclosed.

BRIEF SUMMARY OF THE INVENTION

The essence of the invention is that the engine controller includes a feedback loop that continuously senses the instantaneous alternator current and continuously computes an instantaneous voltage that would exist across a tuning capacitor if a tuning capacitor were in the circuit and the alternator inductance and that tuning capacitance were in series resonance. The controller uses the computed capacitor voltage to modify the amplitude and phase of the forward loop control signal, and therefore modify the current controlled by the switching mode rectifier, in a way that causes the controller circuit to mimic or imitate the operation of the alternator circuit as if a tuning capacitor were present. Because no tuning capacitor is actually in the circuit but the circuit output from its switching mode rectifier is the same as it would be if a tuning capacitor were present, the capacitance is described as a virtual tuning capacitor. As explained above, a tuning capacitor is effective because, at the operating frequency ω of the alternator, its capacitive reactance is equal in magnitude and 180° opposite in phase from the inductive reactance of the alternator winding. A control system of the invention continuously and repeatedly computes the virtual capacitor voltage v at this resonant condition according to the calculation:

$$v = L_{alt} \omega^2 \int i(dt)$$

where $L_{alt}$ is the alternator inductance, i is the alternator current, t is time and ω is the engine/alternator radian operating frequency. This synthesized tuning capacitor voltage signal provides the effect of a virtual tuning capacitor. The control system uses this computed virtual capacitor voltage to modify the signal that controls the pulse width modulator by continuously and repeatedly subtracting the computed virtual capacitor voltage v from the signal that is generated in the forward loop and applied to the pulse width modulator for controlling the phase and duty cycle of the switching mode rectifier.

More specifically, the invention is an improved control system for an electrical power generating source comprising a free piston Stirling engine driving a linear alternator having an alternator winding with an inductance $L_{alt}$, a switching mode rectifier connecting the alternator winding to an output circuit including an electrical energy storage means, and a pulse width modulator for controlling the rectifier switching duty cycle. The control system includes a forward loop having an output connected to control the pulse width modulator. The improvement uses a sine wave generator in the forward loop for generating a sine wave at an operating frequency ω for the engine and alternator. The invention has a feedback loop comprising: (i) a current sensor connected in the alternator circuit for sensing a signal that is proportional to alternator current i; (ii) a virtual capacitor summing point in the forward loop and connected to input a sine wave generated by the sine wave generator and output a signal that is the difference between the input sine wave and a second input to the summing point; and (iii) a computing circuit connected to the current sensor for calculating the voltage v across a virtual capacitor and applying a signal representing the capacitor voltage v to the second input of the virtual capacitor summing point. The computing circuit performs the operation $$L_{alt} \omega^2 \int i(dt) = \frac{L\omega^2}{s} i.$$

In addition to the improvement which computes the voltage across a virtual tuning capacitor, the circuit also has at least one feedback control loop for controlling another variable of the electrical power generating source, such as the DC output voltage or the head temperature of the Stirling engine.

The improved method for controlling an electrical power generating source of the type described above comprises the steps of: (a) applying a command value of a controlled variable of the electrical power generating source, or of an output circuit, to a feedback control loop and sensing and applying a sensed value of the controlled variable as the feedback signal of the feedback control loop to develop a signal representing a commanded value $V_{internal\ cmd}$ of a voltage, $V_{internal}$ (the voltage $V_{Internal}$ being the algebraic sum of the voltage $V_g$ induced in the alternator winding and the voltage across the alternator winding resistance $R_{ac}$ at an operating frequency ω) (b) sensing the current in the alternator winding to generate a signal that is proportional to the alternator current i; (c) generating a signal representing a voltage v across a virtual capacitor by computing $v = L_{alt} \omega^2 \int i(dt)$ from the sensed current; (d) subtracting the signal representing the voltage v from the signal $V_{Internal\ cmd}$ to generate a signal representing an alternator terminal voltage $V_T$; and (e) applying a signal representing the voltage $V_T$ to the controlling input of the pulse width modulator. The control system continuously and repeatedly subtracts the computed virtual capacitor voltage from the signal being developed to apply to the pulse width modulator for controlling the phase and duty cycle of the switching mode rectifier.

BRIEF DESCRIPTION OF THE SEVERAL VIEWS OF THE DRAWINGS

FIG. 1 is a schematic and block diagram of a prior art alternator, alternator output circuit and load for supplying AC power out.

FIG. 2 is a schematic and block diagram of a prior art alternator, alternator output circuit and load for supplying DC power out.

Figure 3:
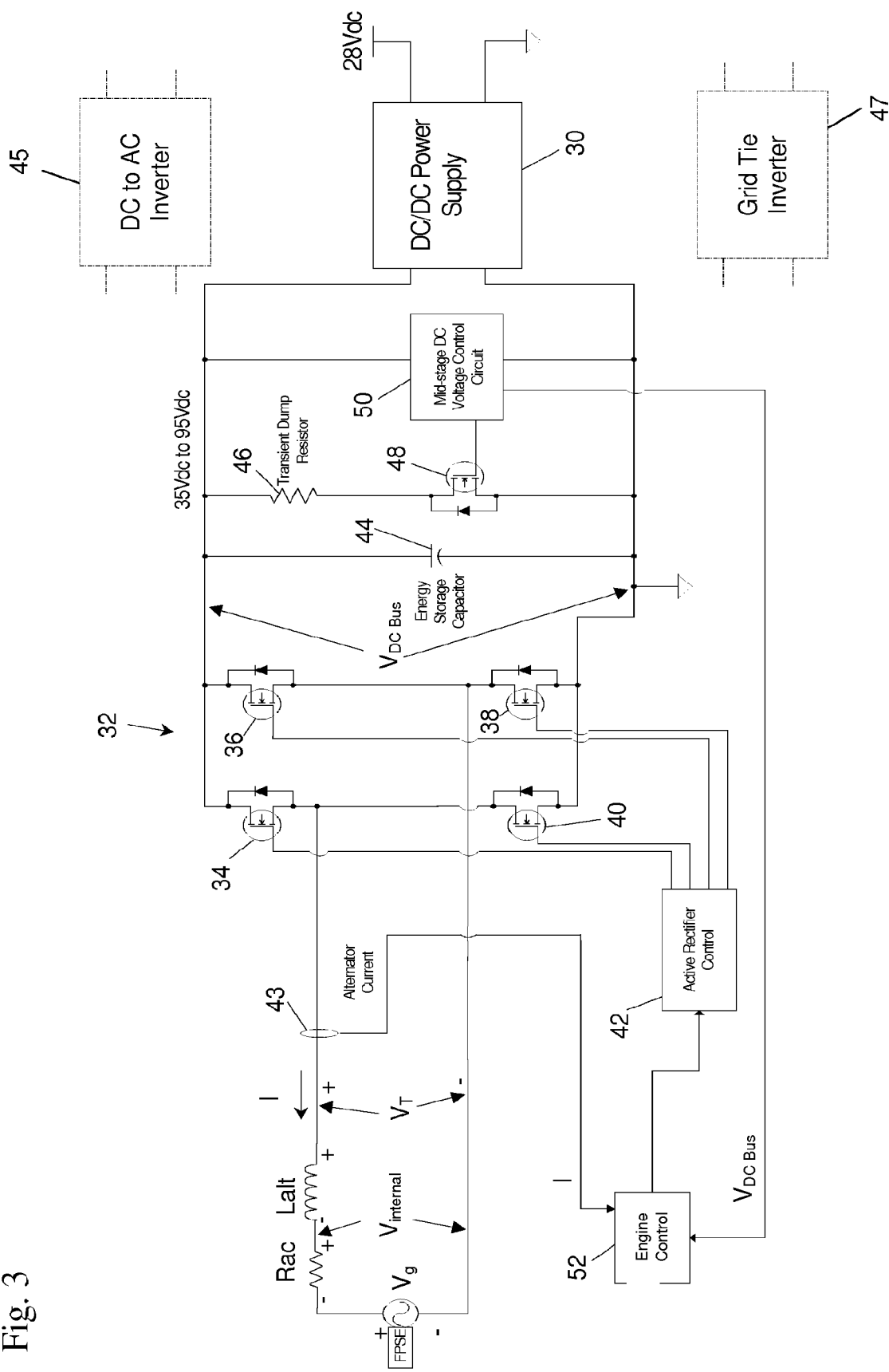
FIG. 3 is a schematic diagram of an electrical power generating source comprising a free piston Stirling engine driving a linear alternator along with a control circuit for controlling the electrical power generating source and embodying the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 7:
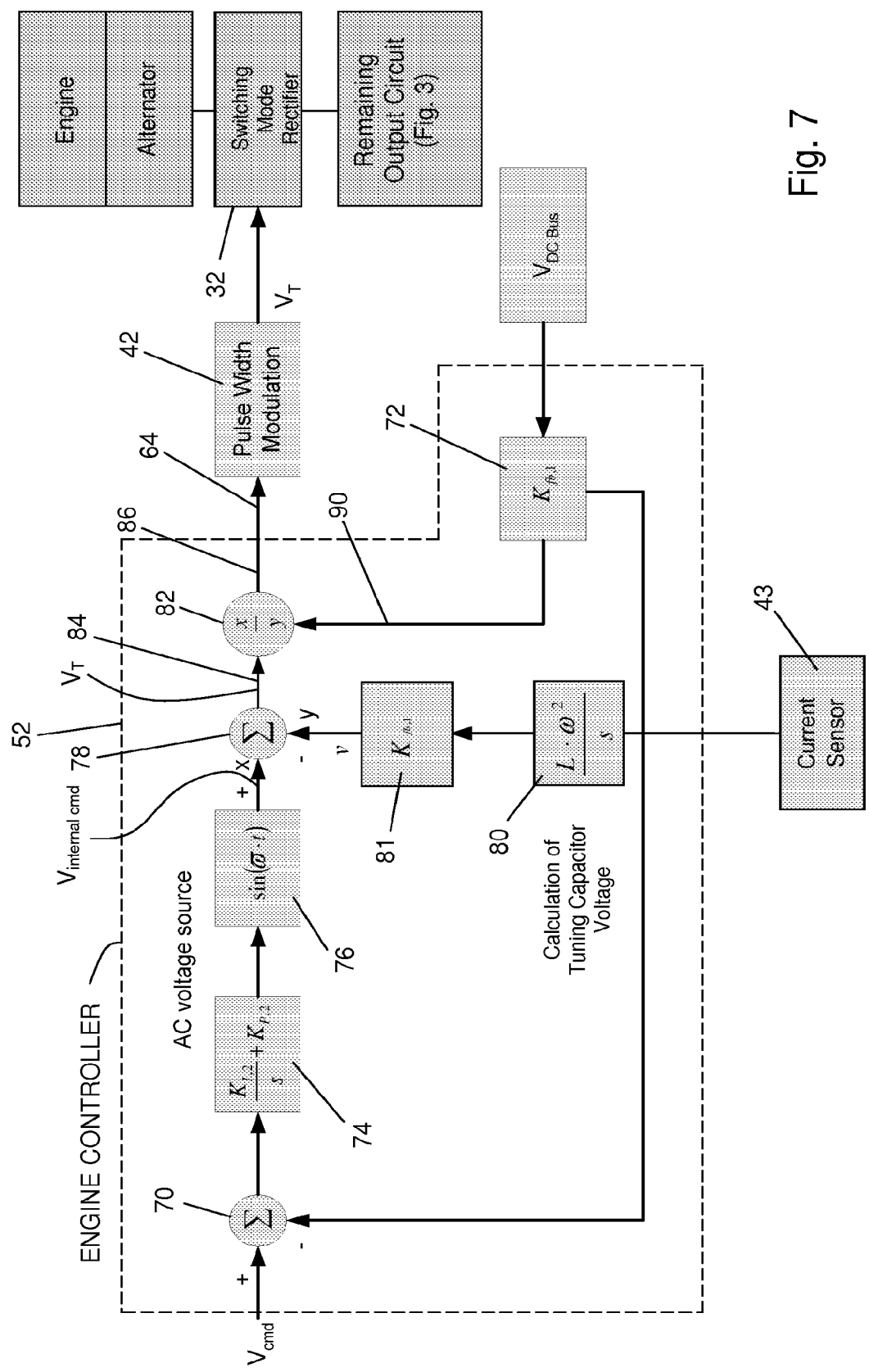
FIG. 7 is block diagram of a negative feedback control system illustrating the preferred embodiment of the invention.

The apparatus of the invention is an improved control system for a free-piston Stirling engine driving a linear alternator having its output current controlled by a switching mode rectifier. The concepts of the invention are best illustrated by and described in association with a feedback control system diagram of the type that those skilled in the feedback control art are familiar with, such as shown in FIG. 7. However, the feedback control diagram can be better understood if preceded by an explanation of an embodiment of the circuitry that is controlled by and includes the control system. This description of the invention includes several variables and parameters and they are collected together and defined at the end of this description.

Circuitry

FIG. 3 is a schematic diagram of a circuit that includes the invention. The alternator that is driven by the free-piston Stirling engine is, as in FIGS. 1 and 2, shown as its equivalent, lumped-element alternator circuit comprising $V_g$, $R_{ac}$ and $L_{alt}$ having a terminal voltage $V_T$. The instantaneous value of voltage $V_g$ is directly proportional to the instantaneous piston velocity and they are related by a proportionality constant which is the open circuit linear alternator motor constant α. Piston velocity is directly proportional to piston stroke. The terminal voltage $V_T$ is greater than $V_g$ by the sum of the voltages across the impedances $R_{ac}$ and $L_{alt}$ with the current and voltage conventions shown on the drawings.

The alternator terminals are connected to an H-bridge of a full wave switching mode rectifier 32 consisting of four power MOSFETs 34, 36, 38 and 40, transistors or other switching elements and a control circuit 42, identified as an Active Rectifier Control 42. Although not shown in FIG. 3, the active rectifier control circuit 42 includes a pulse width modulator within the control circuit 42. The pulse width modulator controls the switching of the four MOSFETs 34, 36, 38 and 40 in the manner known to those skilled in the art and summarized above. As a result, the alternator terminal voltage $V_T$ is a series of square pulses having a duty cycle controlled by the switching mode rectifier and an amplitude approximately equal to the DC voltage across an energy storage capacitor 44, that is further described below. An alternator current feedback signal is obtained from an alternator current sensor 43 that applies a signal representing the alternator current to the engine control circuit 52. Although not as effective, a half wave, switching mode rectifier can alternatively be used.

The output from the switching mode rectifier 32 is applied, in preferred embodiments, to an energy storage capacitor 44. However, a storage battery may be substituted for or inserted parallel to the capacitor 44. Other types of devices can be used if they are able to store electrical energy under static conditions such as in the form of electrical charge. The two most practical devices currently known which can be used are a capacitor and a battery. Another device can be used if it allows an electrical current to be passed through the device to incrementally increase the stored energy, retains its stored energy in the absence of an electrical current and allows the energy to be recovered in the form of electrical current through a load attached to the device. For example, such a device would be a motor/alternator with an attached flywheel for storing energy. Because there are alternative energy storage devices that can be used, the term "electrical energy storage means" is used to refer to devices that meet these criteria for alternative implementations of the invention.

In addition to the energy storage capacitor 44, the output circuit also has a conventional voltage regulating circuit 30, identified as a DC/DC Power Supply, which has its input connected across the energy storage capacitor 44. The voltage regulating circuit 30, operates in the manner known to those skilled in the art to provide an output at a constant voltage despite variations in the mid-stage voltage across the energy storage capacitor 44. There are a variety of conventional circuits that can be substituted as alternatives for the regulating circuit 30 to provide output electrical power having a variety of different characteristics. For example, an inverter 45 can be substituted in order to provide an AC output for a useful load or a grid tie circuit 47 can be substituted to connect the output to the power grid. Additionally, the regulating circuit can be eliminated for supplying less regulated DC power, such as for battery charging.

The circuit of FIG. 3 additionally has a power dumping circuit connected parallel to the energy storage capacitor 44 and consisting of a transient dump resistor 46 serially connected to a power MOSFET 48. A mid-stage voltage control circuit 50 is also connected across the energy storage capacitor 44 and senses the voltage across that capacitor. One function of the mid-stage voltage control circuit 50 is to turn ON the MOSFET 48 if the voltage across the capacitor 44 exceeds a predetermined, selected, excessive level, such as 95 vdc, in order to allow excess energy transferred from the Stirling engine to be consumed and thereby prevent the Stirling engine from over-stroking and colliding in the event that the mid-stage voltage across the capacitor 44 becomes excessive. Such an excessive mid-stage voltage can occur if an electrical load is suddenly removed causing a step function reduction in consumed power. This power dumping circuit is needed only during the transient period following the step function change in the output load and until the remaining control circuit accommodates the change and comes to a steady state condition.

Figure 4:
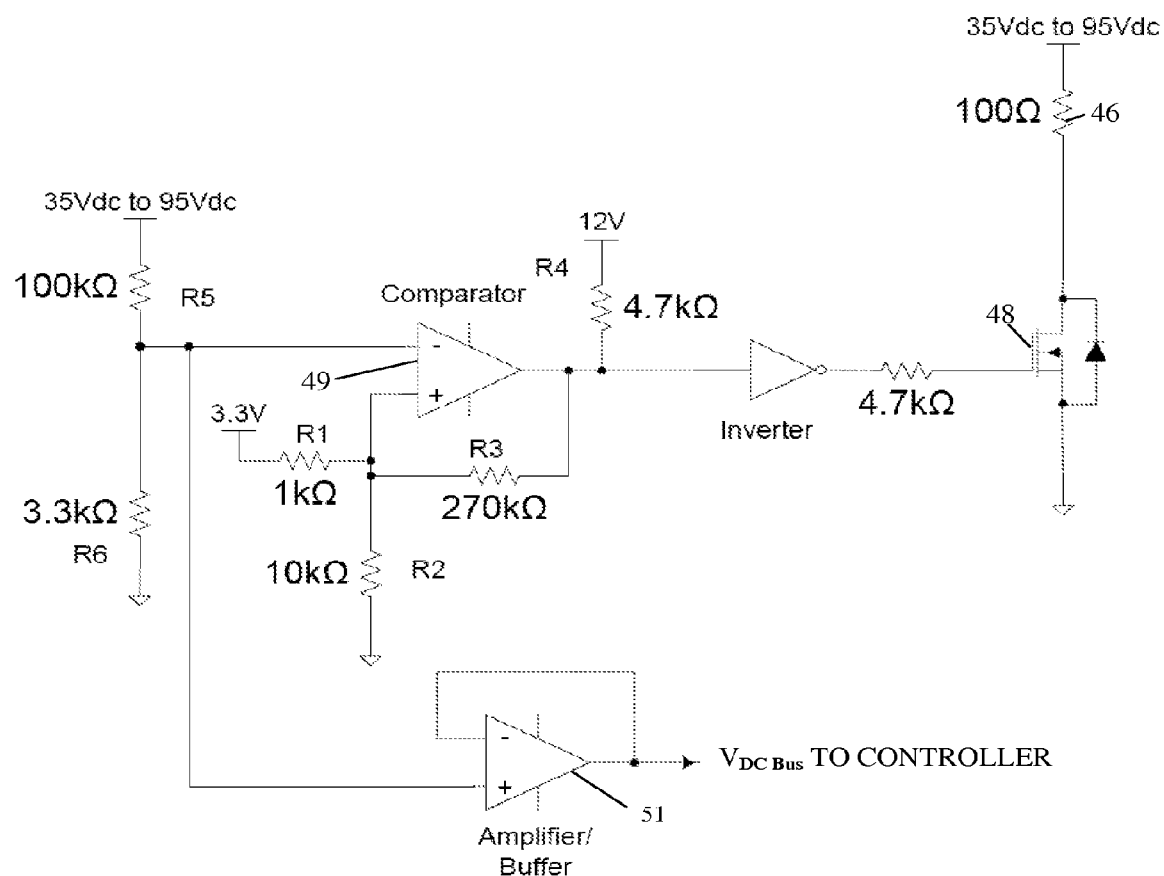
FIG. 4 is a schematic diagram of the mid-stage voltage control circuit 50 of FIG. 3.

Because of space limitations on FIG. 3, the mid-stage voltage control circuit 50 is separately illustrated in FIG. 4. Resistors R5 and R6 form a voltage divider that divides the mid-stage voltage $V_{DC\,Bus}$ across the energy storage capacitor 44 (FIG. 3) down to something close to 3.3V max. The voltage divider formed by resistors R5 and R6 operates as a sensor because it provides a signal representing a measured value of an operating parameter, in this instance the voltage $V_{DC\,Bus}$. This reduced voltage is then used in two places.

First, the reduced voltage is used to control the over-voltage protection power dumping circuit consisting of the transient dump resistor 46 serially connected to the power MOSFET 48. When the reduced mid-stage voltage is greater than about 3.0V (corresponds to a mid-stage voltage of 95 Vdc), the output of the comparator 49 changes from high to low. This signal is then inverted, turning on the MOSFET 48 and dump resistor 46, which discharges the energy storage capacitor 44 (FIG. 3) and protects the power components from damage due to overvoltage. Once the output of the comparator 49 has gone low, it remains low until the reduced mid-stage voltage drops below about 2.7V (corresponds to a mid-stage voltage of 85 Vdc). The comparator output then returns high and MOSFET 48 is turned off.

Second, in order to permit the preferred embodiment of the invention to regulate $V_{DC\,Bus}$, the reduced voltage from the voltage divider formed by resistors R5 and R6 provides a feedback signal that represents the voltage $V_{DC\,Bus}$ across the energy storage capacitor 44. That feedback signal is applied to the closed loop, negative feedback control 52 embodying the invention that will be discussed further in connection with FIG. 7.

Basic Principles of the Invention

Figure 5:
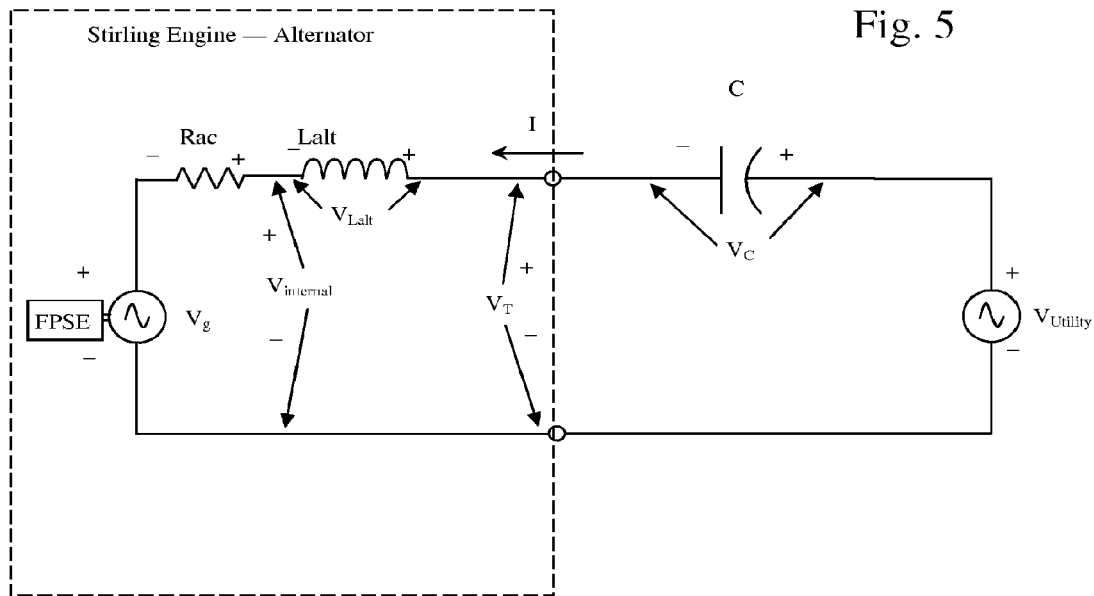
FIG. 5 is a schematic diagram of a basic equivalent circuit utilizing a tuning capacitor connected to a utility grid and labeled for explanation of principles of the invention.
Figure 6:
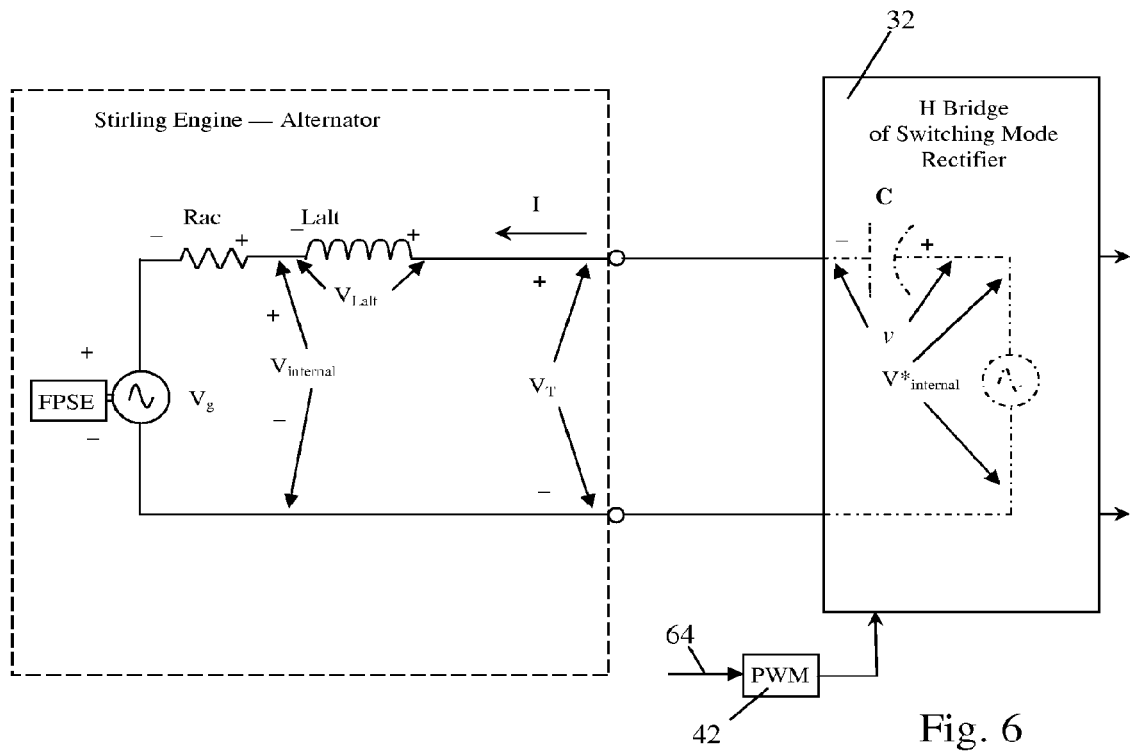
FIG. 6 is a schematic diagram of a basic equivalent circuit utilizing a virtual tuning capacitor in accordance with the invention and labeled for explanation of principles of the invention.

The principles upon which the invention is based are illustrated in FIGS. 5 and 6. FIG. 5, like FIGS. 1-3, shows the alternator as its equivalent, lumped-element circuit having, in series, an inductor having inductance $L_{alt}$, a lumped resistance $R_{ac}$, and an AC voltage source having an induced or back emf $V_g$ as explained in connection with FIGS. 1-3. Because of the inductive reactance of the alternator winding, the output terminal voltage $V_T$ is out of phase with the alternator current resulting in an undesirable power factor of less than 1. As known in the prior art and described above, a tuning capacitor C can be connected in series with the alternator winding to tune out the winding inductance. The capacitance of the tuning capacitor is chosen so that, at the operating frequency of the alternator and engine, the inductive reactance of the winding and the capacitive reactance of the tuning capacitor form a series resonant circuit. Such a series resonant circuit exhibits a zero or resistive impedance because, at the operating frequency ω of the alternator, the capacitive reactance is equal in magnitude and 180° opposite in phase from the inductive reactance of the alternator winding. The tuning capacitor C consequently provides a unity or near unity power factor at a single frequency which maximizes power transfer from the alternator to the electrical load $Z_L$ and minimizes resistive heat losses.

As also known to those skilled in the prior art and explained above, the output of the series connected alternator and tuning capacitor can be connected to a utility electrical power grid and used to supply electrical power to the grid. The frequency and amplitude of the utility voltage are essentially constant and unaffected by an engine/alternator connected to it. With such a connection, the free-piston Stirling engine and alternator will run in synchronism (i.e. at the same frequency and substantially in phase) with the electrical grid voltage $V_{utility}$. In this synchronous condition, the alternator voltage $V_g$ is substantially equal to and in phase with the utility voltage $V_{utility}$.

Not only is piston phase in synchronism with $V_g$ and $V_{utility}$, but piston velocity and stroke are also proportional to the amplitude of $V_g$ and they are related by the proportionality constant α which is the linear alternator motor constant. Piston stroke and velocity are proportional to $V_g$ and the piston is in phase with $V_g$ because of the mutual magnetic linkage between the magnets carried by the piston and the magnetic field resulting from the alternator winding current and because it is the magnets' magnetic field that induces the voltage $V_g$ in the alternator winding.

Because the voltage $V_g$ follows the voltage $V_{utility}$, the voltage $V_{utility}$ could be used to control the piston stroke if the voltage $V_{utility}$ could itself be controlled. Obviously, a real utility voltage can not be controlled by a single consumer. However, the invention creates a virtual $V_{utility}$ by appropriately controlling the switching mode rectifier so that both the amplitude and the phase of the virtual $V_{utility}$ can be controllably varied. Because of the above described relationship between $V_{utility}$, $V_g$ and piston stroke, the switching mode rectifier can control the piston stroke. Furthermore, in the invention, the switching of the switching mode rectifier can simultaneously also be controlled to create a virtual tuning capacitor C that tunes out the inductance of the alternator winding. A serially resonant tuning capacitance is necessary for a utility voltage to maintain control of the phase and stroke of an engine/alternator. With the invention, maintaining this virtual tuning capacitor in the circuit creates conditions that are analogous to the connection of an engine/alternator to a utility grid.

As known to persons skilled in the art and familiar with switching mode rectifiers, a switching mode rectifier can control both the phase and the amplitude of the current through it. The phase of the current through the switching mode rectifier is controlled by controlling the phase of its control signal, typically a sinusoid at the operating frequency ω. The amplitude of the switching mode rectifier current is controlled by the amplitude of that control signal which controls the duty cycle of the switching of the switching mode rectifier. A controller embodying the present invention generates a control signal that controls the switching mode rectifier to simulate a circuit like FIG. 5.

The general concept of the invention is illustrated in FIG. 6. A switching mode rectifier comprises an H-bridge 32 controlled by its pulse width modulator controller 42. In the invention, the control signal applied to the input 64 of the controller 42 causes the H-bridge 32 to be switched in a manner that makes the H-bridge 32 appear to the alternator as a virtual tuning capacitor C connected in series with a virtual utility voltage, termed $V^*_{internal}$. In other words, the invention switches the switching mode rectifier in a way that causes the alternator terminal voltage $V_T$ and alternator current at the alternator terminals (which is the switching mode rectifier voltage and current) to be the same as the alternator terminal voltage and current would be if there were a tuning capacitor and a series resonance condition. Because it is a switching mode rectifier, the phase and amplitude of its current is controlled by a control signal applied to its control input 64. Consequently, the switching mode rectifier of FIG. 6 controls the phase and amplitude of the alternator current I. The switching mode rectifier controllably varies the phase and the amplitude of the alternator current over wide ranges.

Use of "$V_{internal}$"

Before proceeding to an explanation of the manner in which the invention emulates a circuit with a tuning capacitor, it is desirable to discuss some further aspects of the operation of the Stirling engine. The switching mode rectifier, which controls alternator current, is switching at a much higher frequency than the operating frequency ω of the engine/alternator. Therefore, typically there may be on the order of 80 to 400 switching cycles of the switching mode rectifier (although there can be more) over each low frequency cycle of the engine and alternator, with the duty cycle of each high frequency switching cycle determined by the instantaneous amplitude of the sinusoidal control signal applied to the control input 64. As a result, the control circuit is able to respond and make adjustments at the high frequency switching rate, a rate far higher than the low frequency operating frequency of the engine and alternator. Adjustments can be made within a small interval of a low frequency cycle.

Piston stroke is controlled by temporarily reducing or increasing alternator current to allow a piston stroke change. Alternator current generates a magnetic field that exerts a force upon magnets carried by the piston and therefore on the piston. Specifically, a damping force is exerted on the piston that is directly proportional to the alternator current and the proportionality constant is the motor constant α. Temporarily reducing the alternator current results in less damping force and therefore less mechanical load upon the piston which allows the piston stroke to increase. Temporarily increasing the alternator current results in a greater damping force applied to the piston and therefore a greater mechanical load upon the piston which reduces the piston stroke. After the stroke changes, the system comes to a new equilibrium at the higher or lower piston stroke and therefore at a higher or lower power output with the power output from the engine again equal to the power transferred from the engine to the alternator. However, it is desirable that these changes are able to occur at a rate much higher than the operating frequency of the engine; that is within a time interval far less than the period of the oscillations of the engine reciprocations.

In the following discussion, the voltage $V_{internal}$ and the other voltages that are referred to are complex, meaning that they can be represented by phasors that have an amplitude and a phase angle that can be varied by the control system and have time changing instantaneous values across the low frequency cycles of the Stirling engine and alternator. As previously described, the motion of the piston of the Stirling engine is synchronous with $V_g$ and the piston stroke is controlled by alternator current. Referring to FIG. 6, there is a voltage $V_{internal}$ that is the phasor sum of $V_g + V_{Rac}$. The invention uses the voltage $V_{internal}$ to control the engine/alternator. The inclusion of the voltage $V_{Rac}$ across $R_{ac}$ as a component of $V_{internal}$, and controlling the engine/alternator based upon $V_{internal}$ instead of $V_g$, allows the control system to respond more quickly (sooner) and therefore maintain piston control within narrower limits. Control is improved if the control system develops a commanded $V_{internal}$ which is represented by the variable $V_{internal\ cmd}$.

The reason control from $V_{internal}$ allows a faster response and tighter control of piston stroke to within closer boundaries around $V_{internal\ cmd}$ may be explained by first comparing the responsiveness to disturbances of $V_{internal}$ and $V_g$. Changes in $V_g$ occur more slowly because $V_g$ is proportional to piston velocity and piston velocity changes slowly because of the mass and inertia of the piston, the magnets and magnet support attached to the piston and the springs acting upon them. Because of the mass of this oscillating piston, it takes an engine cycle or two for instantaneous piston velocity (at a corresponding point in its cycle) to change appreciably. Therefore, over a few PWM switching cycles, $V_g$ is essentially constant.

However, any change in alternator current will be immediately reflected in a change of the voltage $V_{Rac}$ across the alternator resistance $R_{ac}$. Consequently, because $V_{internal} = V_g + V_{Rac}$, any change in alternator current will be immediately reflected in a change of $V_{internal}$ even though $V_g$ remains constant for a cycle or two of engine operation. Responsiveness to changes in alternator current is important because alternator current is controlling piston stroke. A change of the voltage $V_{Rac}$ across resistance $R_{ac}$ will be sufficient to be responded to by the control loop within a very small portion of a period of the engine operating frequency. This contrasts with the requirement of one or two engine operating periods being required for a change in $V_g$ to occur that is sufficient to be sensed and responded to by the control loop. Since $V_{internal}$ is the sum of $V_g$ and $V_{Rac}$, using $V_{internal}$ to control the current and therefore the stroke, allows the negative feedback control loop to respond to changes that occur at the high frequency switching rate rather than being confined to responding to changes that occur at the low frequency engine operating frequency. The result is that the invention provides a quicker response to small changes in alternator current and therefore permits control of piston stroke within closer or tighter boundaries. The $V_{internal}$ control loop responds at a rate of a few kHz.

The manner in which changes in $V_{internal}$ control changes in alternator current can be seen from the equivalent circuit for the alternator illustrated in FIG. 6. The sum of the voltages around the circuit loop consisting of $V_g$, $R_{ac}$ and $V_{internal}$ must be zero, according to Kirchoff's second law. Consequently, a reduction in $V_{internal}$ means an increase in current through $R_{ac}$ because $V_g$ is essentially constant over a cycle of the high switching frequency of the switching mode rectifier. Conversely, an increase in $V_{internal}$ means a decrease in current through $R_{ac}$. Therefore, because $V_{internal}$ responds faster than $V_g$, basing control on $V_{internal}$ provides a circuit that is able to respond to small, incremental changes that occur in a small fraction of a low frequency cycle of the engine and thereby maintain tighter control of piston stroke and power balance.

Virtual Tuning Capacitor Emulation Using $V_{internal}$

Reference to FIG. 6 shows that the relationship between $V_{internal}$ and the alternator terminal voltage $V_T$ is:

$$V_T = V_{internal} + V_{Lalt} \tag{eq. 1}$$

At resonance, $$\omega^2 = \frac{1}{LC} \tag{eq. 2}$$

and

The capacitor voltage (equal and opposite the inductor voltage) is:

$$v = \frac{1}{C} \int i(dt) \tag{eq. 3}$$

Solving (eq. 2) for C and substituting in (eq. 3) gives:

$$v = L_{alt}\omega^2 \int i(dt) = \frac{L\omega^2}{s} i \tag{eq. 4}$$

(eq. 5) The virtual capacitor voltage $v = -V_{Lalt}$
Therefore, from eq. 1, 4 and 5

$$V_T = V_{internal} - v = V_{internal} - \frac{L\omega^2}{s} i \tag{eq. 6}$$

Equation 6 shows that, in order to get an alternator terminal voltage $V_T$ that is the same as it would be with a resonant tuning capacitor, $V_{internal}$ must be modified by the virtual capacitor voltage $$v = \frac{L\omega^2}{s} i$$

when no capacitor is actually in the circuit.

The Preferred Control System

FIG. 7 is a diagram of a closed loop, negative feedback control system forming the engine controller 52 in the circuit of FIGS. 3 and 4 and can, of course, be embodied in a variety of other hardware implementations. Referring now to FIG. 7, the ultimate output of the forward loop signal passing across the top of the diagram along the forward elements is applied to the pulse width modulator 42 that controls the duty cycle and phase of the switches 32 of the switching mode rectifier in the manner previously described.

The embodiment of FIG. 7 has an outermost control loop that controls the mid-stage voltage $V_{DC}$ BUS (FIG. 3) according to negative feedback control principles. The mid-stage voltage $V_{DC\ Bus}$ is the voltage across the energy storage capacitor 44 or other electrical energy storage means. The outermost control loop has a command input, $V_{cmd}$, that is applied to a voltage control summing point 70. The command input, $V_{cmd}$, is a signal representing the desired value of the mid-stage voltage $V_{DC\ Bus}$. The circuit can be designed to permit $V_{cmd}$ to be manually selected or, preferably, its value is fixed in the circuit or software based upon the particular application and the desired, design value of the mid-stage voltage $V_{DC\ Bus}$.

The feedback signal for this outer, mid-stage voltage, control loop is obtained, as explained above, from a voltage sensor, which is a voltage sensing circuit in the DC voltage control circuit 50 (FIGS. 3 and 4) that senses the voltage, $V_{DC\ Bus}$, across the electrical energy storage means 44 and applies a feedback signal, that represents $V_{DC\ Bus}$, through a constant multiplier 72 to the summing point 70. The error signal from summing point 70 is integrated and amplified (multiplied) by the forward control element 74 of a conventional PI controller, which alternatively could be a conventional PID controller. The mid-stage voltage control loop performs a voltage regulator function by controlling and maintaining the bus voltage $V_{DC\ Bus}$ within acceptable limits. The output of the forward control element 74 is applied to a sinusoidal function generator 76 having a modulatable amplitude that is modulated by the signal from the forward control element 74. The frequency ω of the sine wave output of the sinusoidal function generator 76 is fixed at or near the resonant frequency of the Stirling engine and, in the illustrated embodiment, is the designed operating frequency of the Stirling engine and alternator. Although these operations are preferably performed digitally using conventional programming algorithms, the effect is to generate a sinusoid having an amplitude that is proportional to the output signal from the forward control element 74 at the engine/alternator operating frequency ω. This sinusoid is the commanded value $V_{internal\ cmd}$ of the circuit parameter $V_{internal}$. As will be seen, this $V_{internal\ cmd}$ signal, after some modification, controls the switching mode rectifier. Consequently, alternator current, and therefore piston stroke, is a function of $V_{internal\ cmd}$. As a result, the outer, mid-stage voltage, control loop maintains bus voltage $V_{DC\ Bus}$ by increasing or decreasing piston stroke in response to sensed changes in $V_{DC\ Bus}$ caused by more or less power being delivered to a load from the energy storage capacitor 44 (FIG. 3).

In order to generate an alternator terminal voltage that emulates the presence of a capacitor tuned for resonance with the alternator inductance, $V_{internal}$ must be modified by subtraction of the virtual capacitor voltage v as explained above. In order to accomplish that modification, the $V_{internal\ cmd}$ sinusoid is applied to a virtual capacitor summing point 78. The output of the virtual capacitor summing point 78 is a signal that is the difference between the sine wave input $V_{internal\ cmd}$ applied at X and a second input applied at Y.

A feedback signal is applied at input Y to the virtual capacitor summing point 78. That feedback signal is a complex, time varying signal v representing the computed instantaneous amplitude and phase of the voltage across the virtual capacitance C (FIG. 6). The feedback signal v is derived from the current sensor 43 (FIG. 3) which senses a signal that is proportional to alternator current i. The current signal i is applied to a computing circuit or block 80 for calculating the voltage v across a virtual capacitor and applying a signal representing v to the second input Y of the virtual capacitor summing point 80. The computing circuit 80 performs the operation:

$$L_{alt}\omega^2 \int i(dt) = \frac{L\omega^2}{s} i$$

The resulting output from the summing point 78 is a signal representing the desired $V_{internal\ cmd}$ modified by subtraction of the voltage v across the virtual capacitor.

A scaling and normalizing block 81 is interposed between the output of computing circuit or block 80 and the input to summing point 78. The scaling and normalizing block 81 simply multiplies the output of the voltage calculation block 80 by the constant multiplier $K_{fb,1}$. This is done because the output of the computing circuit block 80 has units of voltage, but the $V_{internal\ cmd}$ from the sinusoidal function generator 76 (the sinusoid) has no units because of the upstream application of $K_{fb,1}$ at summing point 70. More specifically, the command input $V_{cmd}$ has units of volts and $K_{fb,1}$ has units of per volts (/volts). Therefore, the units of the output from summing point 70 are volts/volt, i.e. no units (normalized). This normalized (no units) value carries through the output of the sinusoidal function generator 76 which is applied to the summing point 78. So multiplier block 81 multiplies the other input to the summing point 78 by same factor $K_{fb,1}$ so both inputs to summing point 78 are normalized with the same scaling. As a result, the block 81 makes both inputs to summing point 78 have the same scaling and units.

The operation of the circuit may be described as follows. First, consider the control diagram of FIG. 7 but assume it were simplified so that the output of the sinusoidal function generator 76 were connected directly as the input to the pulse width modulator 42. The resulting control would be a simple, single loop, negative feedback control system which would drive the output circuit voltage $V_{DC\ Bus}$ to the value of $V_{cmd}$. Although there would be undesirable power factor and piston control problems, these need not be considered for this analysis.

However, referring to FIG. 6, if the H-bridge 32 of the switching mode rectifier can be made to switch at a phase and amplitude (amplitude being a function of duty cycle) that makes the H-bridge 32 appear that a virtual tuning capacitance is connected in series with the alternator and has a voltage v across that capacitor that is equal and opposite to the inductor voltage $V_{Lalt}$, then the circuit would operate like the circuit of FIG. 5. The virtual capacitance is made to appear by switching the switching mode rectifier so the alternator terminal voltage $V_T$ is the alternator voltage that would exist if a tuning capacitor were in the circuit. The terminal voltage $V_T$ that would exist is $V_{internal}-v$ as explained above. Therefore, the circuit of FIG. 7 modifies the control signal $V_{internal\ cmd}$ by subtracting capacitor voltage v from $V_{internal\ cmd}$ so that the control system drives $V_{internal}$ to an amplitude and phase that results in the terminal voltage $V_T$ that would exist if a tuning capacitor were present. With the virtual tuning capacitance C in place, the voltage $V_{internal}$ is equal to the voltage $V^*_{internal}$ (FIG. 6) because the series impedance of the inductor $L_{alt}$ and the virtual capacitance C at resonance is essentially an impedance of zero. Consequently, $V^*_{internal}$ becomes a virtual utility voltage that is controlled by the pulse width modulator 42 and operates to control $V_{internal}$ in the manner of FIG. 5.

The preferred control circuit of FIG. 7 additionally includes a feed forward loop. The operation of feed forward loops is known to those skilled in the art. The feed forward loop illustrated in FIG. 7 is not necessary for the invention but enhances operation of the preferred embodiment. Generally, the recognized purpose of a feed forward loop is to sense one or more circuit disturbances, anticipate and predict changes in a controlled variable and use the sensed signals to makes process or operational changes before the controlled variable is affected by the disturbances. The feed forward loop has a division point 82 interposed in the forward loop and having a dividend input 84 connected to receive a signal from the virtual capacitor summing point 78 and a quotient output 86 connected to the pulse width modulator 42. This feed forward loop uses the voltage sensor described above for sensing the voltage $V_{DC\ Bus}$ across the electrical energy storage means (energy storage capacitor 44 in FIG. 3) and the scaling multiplier 72 to which the sensed voltage is applied. This feed forward loop applies a feed forward signal, representing a scaled proportion of the measured voltage $V_{DC\ Bus}$ across the electrical energy storage means, to a divisor input 90 of the division point 82.

The quotient output 86 essentially represents duty cycle and phase. Consequently, this feed forward loop senses disturbances in the form of changes in $V_{DC\ Bus}$ and modifies the duty cycle and therefore the alternator current to maintain the same $V_{DC\ Bus}$ without waiting for the response of the outer negative feedback current control loop that includes summing point 70 and controls $V_{DC\ Bus}$. The division by division point 82 means that an increase in $V_{DC\ Bus}$ decreases the duty cycle and therefore maintains a constant $V_T$ even as $V_{DC\ Bus}$ increases. The multiplying scalar value $K_{fb,1}$ is a value less than one so that it causes a feed forward of only a portion of $V_{DC\ Bus}$ so as not to cause instability and additionally represents the particular hardware that determines the ratio of the duty cycle to the value of $V_{DCBus}$.

The output from the division point 64 of the feed forward loop (or from summing point 78 if the feed forward loops is omitted) provides a control signal at the frequency ω that is applied to the pulse width modulator 42 and controls the duty cycle of the switching of the switching mode rectifier at the high frequency rate. The duty cycle of the switches 32 (FIG. 3) of the switching mode rectifier is proportional to the instantaneous value of this sinusoidal control signal at each time of switching. Therefore, the duty cycle of the ON and OFF states of the high frequency switching of the switching mode rectifier varies across the low frequency cycles of the alternator operating frequency ω in proportion to the instantaneous value of the sinusoidal output signal applied to the pulse width modulator 42, as known in the art of switching mode rectifiers. More specifically (with reference to FIG. 3), over one half cycle of the low frequency ω, the duty cycle of the ON time for one pair of diagonally opposite switches 36 and 40 varies from 50% at zero cross over of the sinusoidal control signal to a maximum at the peak of the sinusoidal control signal. Over the next half cycle, the duty cycle of the ON time for the other pair of diagonally opposite switches 34 and 38 varies from 50% at zero cross over of the sinusoidal control signal to a maximum at the peak of the sinusoidal control signal.

Figure 8:
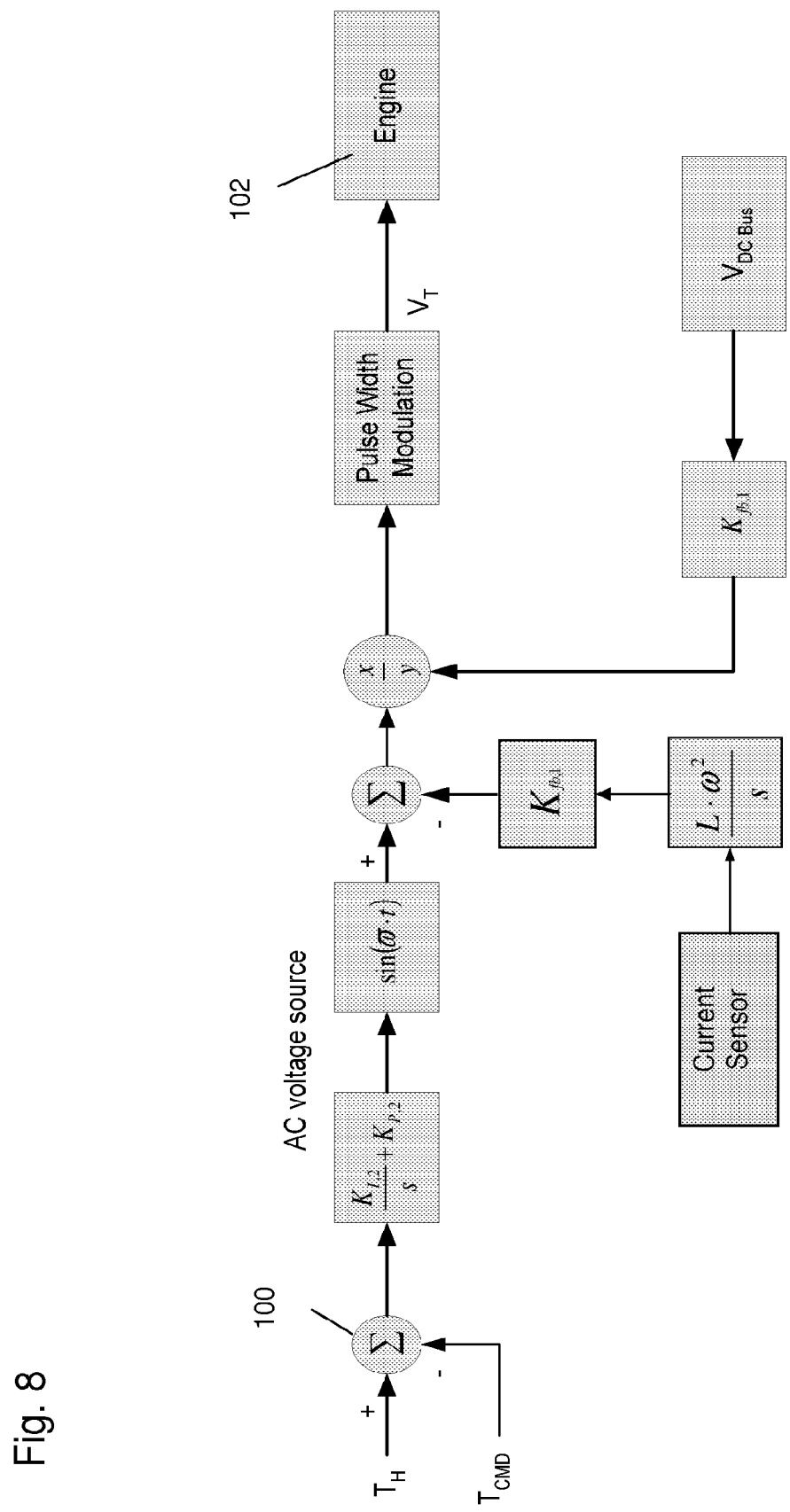
FIG. 8 is block diagram of a negative feedback control system embodying the invention and similar to the control system of FIG. 5 except that it has a control loop for controlling Stirling engine head temperature.

FIG. 8 Alternative Embodiment

FIG. 8 illustrates an embodiment of the invention which is the same as the embodiment of FIG. 7 except that (1) it has a negative feedback control loop for controlling the head temperature of the free piston Stirling engine and (2) it does not illustrate the voltage control loop for controlling $V_{DC\ Bus}$. Of course the circuit can have both the temperature control loop and the voltage control loop because, as known to those skilled in the art, a feedback control system can have multiple, nested control loops that control multiple variables.

As known to those skilled in the art, the head temperature of the Stirling engine is a function of the heat energy transferred to the engine head and as a function of the power withdrawn from the engine by its load, such as an alternator. Head temperature increases as a result of transferring more thermal power to the head and decreases as a result of transferring more power to the load of the engine. Since the Stirling engine operates at its highest efficiency when operated at the highest temperature that its components can withstand without damage, it is desirable to control the head temperature.

The temperature control loop of FIG. 8 has a temperature sensor mounted to continuously sense the temperature of the head of the Stirling engine and providing a sensed temperature signal $T_H$. The temperature control loop of FIG. 8 also has a command input $T_{cmd}$. In the conventional manner, both $T_H$ and $T_{cmd}$ are applied to a summing point 100. For simplicity of illustration, the engine, alternator, switching mode rectifier and the output circuit are combined and illustrated as the engine 102.

The embodiment of FIG. 8 operates in the manner illustrated and described above except that the temperature control loop drives the Stirling engine to maintain a head temperature set by the temperature command input $T_{cmd}$ in accordance with the principles of negative feedback control.

Figure 9:
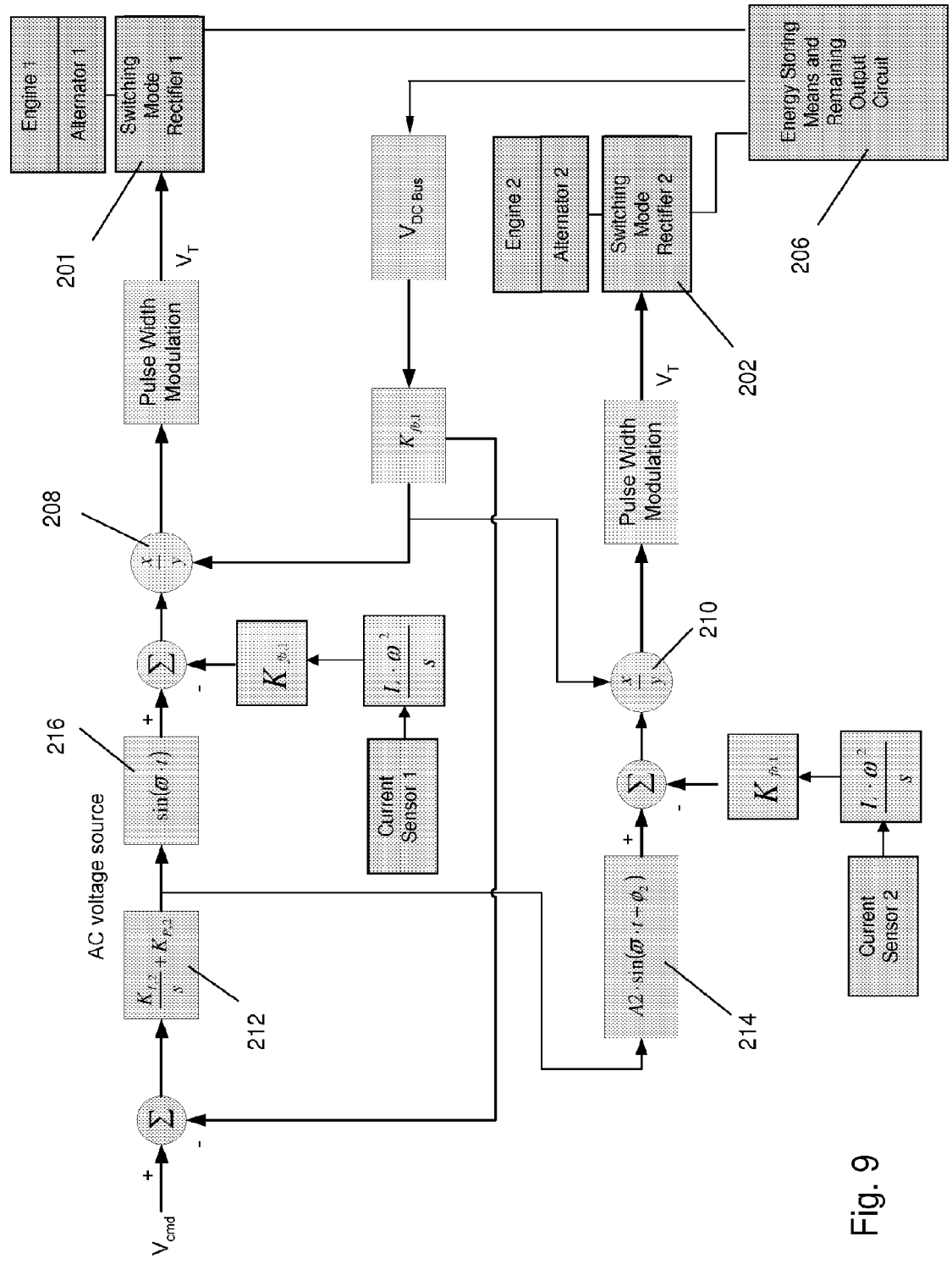
FIG. 9 is block diagram of a negative feedback control system embodying the invention and similar to the control system of FIG. 5 except that it has two branches for controlling and synchronizing two Stirling engine/alternator combinations.

FIG. 9 Alternative Embodiment

For some electrical generation applications, it is advantageous to use multiple Stirling engine/alternator pairs for generating electrical power and applying the generated power of each pair to a single output circuit or load. The application of the electrical output power from multiple generators to a single output requires that their alternators be synchronously operated so that their sinusoidal electrical outputs are in phase, or at least close, and therefore sum at the output. Additionally, as known in the art, when multiple, substantially identical, reciprocating machines are mounted to a common support, the amplitude of vibration resulting from their reciprocation can be reduced substantially if the machines are balanced. Such balancing is best accomplished by mounting the machines so that their reciprocating masses reciprocate along a common axis but with their motion being physically 180° out of phase.

FIG. 9 illustrates an embodiment of the invention that controls two, nominally identical, engine/alternator pairs in a manner that maintains their operation in synchronism while also controlling each pair in a manner that accomplishes the other advantages and features of the invention. Preferably, engine 1 and alternator 1 are arranged so their reciprocating components reciprocate along the same axis as the reciprocating components of engine 2 and alternator 2 but engine 1 and alternator 1 are physically in a mirror image configuration with respect to engine 2 and alternator 2. The outputs of their switching mode rectifiers 201 and 202 are connected to the same energy storage means, such as an energy storage capacitor or battery like that illustrated in FIG. 3, which is a part of the output circuit 206 connected to the switching mode rectifiers 201 and 202.

The control system of FIG. 9 has two, parallel, control systems that each applies its output to a different one of the switching mode rectifiers 201 and 202. As with the embodiment of FIG. 7, feedback of the sensed $V_{DC\ Bus}$ is derived from the energy storage means in the output circuit. However, the scaled $V_{DC\ Bus}$ is applied to the division points 208 and 210 of both of the parallel control systems. The two, parallel, control systems are each identical to the control system of FIG. 7 except as follows.

Current sensor 1 senses the current in alternator 1 and current sensor 2 senses the current in alternator 2. Consequently, each of the two, parallel control systems computes a voltage across its virtual tuning capacitor based upon the current in the engine/alternator pair it controls.

Advantageously, the sinusoid generator of one of the two, parallel control systems provides the potential for generating a sinusoid with a different amplitude and a different phase than generated by the other sinusoid generator. This permits adjustments to be made in the amplitude and phase of one of the two, parallel control systems with respect to the other. The sinusoid generator 214 generates a sinusoidal output that has a phase difference $\Phi_2$ from the output of the sinusoid generator 216. This adjustment of the relative phase of the two sinusoids permits the control circuit to compensate for differences in the inductances of the two alternators and to compensate for small mechanical differences that result in differences in mechanical tuning, such as small differences in masses and springs between the two alternators or engines. Having an amplitude A2 for the sinusoid generator 214 that differs from the amplitude of the sinusoid generator 216 allows compensation for other magnitude based differences, such as differences between the magnet strengths of the two alternators. Of course these differences would also allow the two engine/alternator pairs to be operated at different phase angles and/or different amplitudes if desired. For example, instead of mounting the two engine/alternator pairs in a physical mirror image configuration, they can be mounted side by side and in the identical orientation to conserve space, operated physically 180° out of phase, and have the alternator winding connection of one reversed from the alternator winding connection of the other so that the electrical outputs are in phase.

Figure 10:
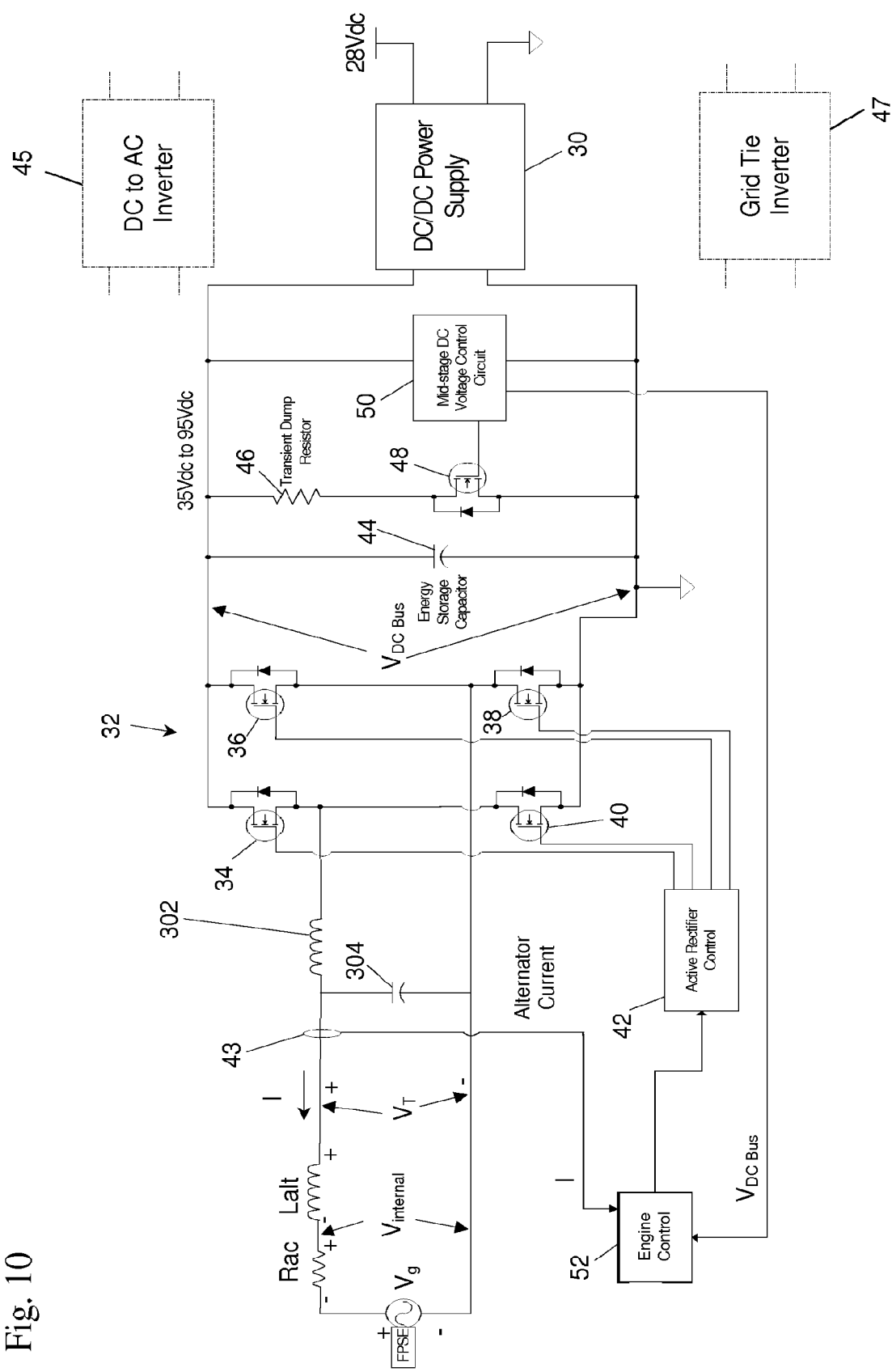
FIG. 10 is an alternative embodiment that is identical to FIG. 3 except for the interposing of an LC filter between the alternator terminals and the switches of the H bridge of the switching mode rectifier.

FIG. 10 Alternative Embodiment

In the operation of the previously described embodiment of the invention, the voltage across the alternator terminals (i.e. at the alternator's connections to the switching mode rectifier switches) is a pulse train at the high switching frequency. The pulses of that pulse train have a pulse height substantially equal to the voltage across the energy storage capacitor 44 with the pulses having a varying duty cycle over each cycle at the alternator frequency ω. When switching occurs, the inductance of the alternator maintains the current and supplies energy into the circuit.

However, the relatively high switching frequency is sufficiently high that it can cause radiation of RF energy which can cause undesirable radio interference and noise. Therefore, where that might be a problem, an LC filter can be inserted between the alternator terminals (the voltage $V_T$) and the switches 34, 36, 38 and 40 of the H bridge 32 of the switching mode rectifier. The voltage at the alternator side of the switching mode rectifier H bridge, becomes a sinusoid at the alternator operating frequency ω instead of the pulse train the high switching frequency. The LC filter comprises an inductor 302 and capacitor 304. The inductor 302 may, for example, have an inductance of 100 microhenries and the capacitor 304 a capacitance, for example, of 0.015 microfarads. The inductor 302 of the filter, in addition to the alternator winding, now also supplies energy and maintains current flow by supplying energy during switching. This LC filter reduces noise generated and radiated at the high switching frequency. However, the LC filter is not necessary for implementation of the described control system and it has the undesirable effect of increasing the size and weight of the equipment. So it is an alternative that requires an engineering tradeoff taking into account the relative importance of suppressing the high frequency radiation and noise in the particular application as compared to the added size and weight in the application.

Frequency Control

There are situations in which it is desired to variably control the operating frequency ω of the Stirling engine. For example, if the engine and/or the alternator is subjected to variations in ambient temperature which can cause variations in the temperature of the components of the engine, these temperature variations can cause the resonant frequency of the Stirling engine to deviate from a nominal design frequency. Such temperature variations may, for example, occur in applications in outer space. With the control system of the present invention, the operating frequency can be changed by changing the value of ω. This is most conveniently accomplished with embodiments using a microprocessor control or other computer based controls. Since the invention computes the voltage across the virtual capacitor, which is a function of the operating frequency ω, embodiments of the invention can easily accommodate this frequency change by utilizing the new value of the operating frequency ω in performing this calculation. Consequently, control is maintained as the frequency is varied.

Therefore, in summary, control systems embodying the invention are able to maintain constant operating frequency ω by maintaining it as the frequency of the sinusoidal function generator. However, this operating frequency can be changed by changing ω and control is maintained. The invention simultaneously adjusts the piston stroke of machine to maintain a constant output DC voltage or a constant head temperature. Importantly, the invention also maintains tighter control of the piston stroke without the need of a piston position sensor, a piston position control loop, or a negative feedback alternator current control loop.

Representative Values of K Constants

The invention illustrated in FIG. 4 can be embodied in differing circuits having differing values of the K constants. However, as an example, a representative set of values is as follows:

$K_{I,2}$=14.648/second (per second)

$K_{P,2}$=0

$K_{fb,1}$=0.009741/V (per volt)

Parameter Definitions

α linear alternator motor constant which relates open circuit alternator voltage to piston velocity and relates alternator current to force on the piston is $$\alpha = \frac{v(\text{alternator} - \text{voltage})[\text{volts}]}{V(\text{piston} - \text{velocity})[\text{meters/sec}]} = \frac{\text{force[newtons]}}{\text{current[amps]}}$$

Actual terminal voltage is a function of current flowing through the alternator because of the internal impedance of the alternator coil. Since piston stroke is proportional to piston velocity, voltage is proportional to stroke at a constant frequency.

$V_{cmd}$ the commanded voltage, $V_{DC\ Bus}$, across the energy storage capacitor.

$V_{DC\ Bus}$ the DC voltage across the storage capacitor or battery.

$V_g$ the instantaneous, open circuit voltage induced on the alternator winding (the back emf voltage).

$V_{Rac}$ the instantaneous voltage across the lumped resistance of the alternator.

$V_{Lalt}$ the instantaneous voltage across the alternator inductance.

$V_T$ the alternator terminal voltage.

$V_{internal\ cmd}$ commanded $V_{internal}$ $V_{internal}$ instantaneous sum of $V_g + V_{Rac}$.

i alternator current v virtual capacitor voltage s Laplace operator designating differentiation 1/s Laplace operator designating integration While certain preferred embodiments of the present invention have been disclosed in detail, it is to be understood that various modifications may be adopted without departing from the spirit of the invention or scope of the following claims.

The invention claimed is:

1. An improved control system for an electrical power generating source comprising a free piston Stirling engine driving a linear alternator having an alternator winding with an inductance $L_{alt}$, a switching mode rectifier connecting the alternator winding to an output circuit including an electrical energy storage means, and a pulse width modulator for controlling the rectifier switching duty cycle, the control system including a forward loop having an output connected to control the pulse width modulator, wherein the improvement comprises:
   (a) a sine wave generator in the forward loop for generating a sine wave at an operating frequency ω for the engine and alternator; and
   (b) a feedback loop comprising:
      (i) a current sensor connected in the alternator circuit for sensing a signal that is proportional to alternator current i;
      (ii) a virtual capacitor summing point in the forward loop and connected to input the sine wave generated by the sine wave generator and output a signal that is the difference between the input sine wave and a second input to the summing point; and
      (iii) a computing circuit connected to the current sensor for calculating the voltage v across a virtual capacitor and applying a signal representing v to the second input of the virtual capacitor summing point, the computing circuit performing the operation $v = L_{alt} \omega^2 \int i\, (dt)$.

2. A control system in accordance with claim 1, wherein the control circuit further comprises:
   (a) a division point interposed in the forward loop and having a dividend input connected to receive a signal from the virtual capacitor summing point and a quotient output connected to the pulse width modulator;
   (b) a feed forward loop comprising a voltage sensor for sensing the voltage across the electrical energy storage means and a scaling multiplier to which the sensed voltage is applied, the feed forward loop applying a feed forward signal, representing a scaled proportion of the measured voltage across the electrical energy storage means, to a divisor input of the division point.

3. A control system in accordance with claim 1, wherein the control circuit further comprises a closed, negative feedback, control loop for controlling the voltage across the electrical energy storage means, the voltage control loop having a command input applied to a voltage control summing point and further comprising:
   (a) a feedback loop comprising a voltage sensor for sensing the voltage across the electrical energy storage means and applying a feedback signal, representing the sensed voltage, to the voltage control summing point; and
   (b) a forward control element having an input from the voltage control summing point and an output connected to control the amplitude of the sine wave generator.

4. A control system in accordance with claim 3, wherein the control circuit further comprises:
   (a) a division point interposed in the forward loop and having a dividend input connected to receive a signal from the virtual capacitor summing point and a quotient output connected to the pulse width modulator;
   (b) a feed forward loop comprising a voltage sensor for sensing the voltage across the electrical energy storage means and a scaling multiplier to which the sensed voltage is applied, the feed forward loop applying a feed forward signal, representing a scaled proportion of the measured voltage across the electrical energy storage means, to a divisor input of the division point.

5. A control system in accordance with claim 1, wherein the control circuit further comprises a closed, negative feedback, control loop for controlling the temperature of the heat receptor of the free-piston Stirling engine, the temperature control loop having a command input applied to a temperature control summing point and further comprising:
   (a) a feedback loop comprising a temperature sensor for applying a feedback signal, representing the temperature of the heat receptor of the free-piston Stirling engine, to the temperature control summing point; and
   (b) a forward control element having an input from the temperature control summing point and an output connected to control the amplitude of the sine wave generator.

6. A control system in accordance with claim 5, wherein the control circuit further comprises:
   (a) a division point interposed in the forward loop and having a dividend input connected to receive a signal from the virtual capacitor summing point and a quotient output connected to the pulse width modulator;
   (b) a feed forward loop comprising a voltage sensor for sensing the voltage across the electrical energy storage means and a scaling multiplier to which the sensed voltage is applied, the feed forward loop applying a feed forward signal, representing a scaled proportion of the measured voltage across the electrical energy storage means, to a divisor input of the division point.

7. A control system in accordance with claim 1, for additionally controlling a second electrical power generating source comprising a second free piston Stirling engine driving a second linear alternator having a second alternator winding with an inductance $L_{alt2}$, a second switching mode rectifier connecting the second alternator winding to the output circuit, and a second pulse width modulator for controlling the second rectifier switching duty cycle, the control system including a second forward loop having a second output connected to control the second pulse width modulator, wherein the control circuit further comprises:
   (a) a second sine wave generator in the second forward loop for generating a second sine wave at the operating frequency ω; and
   (b) a second feedback loop comprising:
      (i) a second current sensor connected in the second alternator circuit for sensing a signal that is proportional to a second alternator current $i_2$;
      (ii) a second virtual capacitor summing point in the second forward loop and connected to input the second sine wave generated by the second sine wave generator and output a signal that is the difference between the input sine wave and a second input to the summing point; and (iii) a second computing circuit connected to the second current sensor for calculating the voltage $v_2$ across a second virtual capacitor and applying a signal representing $v_2$ to the second input of the virtual capacitor summing point, the second computing circuit performing the operation $v_2 = L_{alt2}\omega^2 \int i_2(dt)$.

8. An improved method for controlling an electrical power generating source that comprises a free piston Stirling engine driving, at an operating frequency $\omega$, a linear alternator having an alternator winding with an inductance $L_{alt}$ and a resistance $R_{ac}$, a switching mode rectifier connecting the alternator winding to an output circuit including an electrical energy storage means and a pulse width modulator for controlling the rectifier switching duty cycle, the control system having a forward loop having an output connected to a controlling input of the pulse width modulator, wherein the improvement comprises:

(a) applying a command value of a controlled variable of the electrical power generating source or output circuit to a feedback control loop and sensing and applying a sensed value of the controlled variable as the feedback signal of the feedback control loop to develop a signal representing a command value of a voltage, $V_{Internal}$, that is the algebraic sum of the voltage $V_g$ induced in the alternator winding and the voltage across the alternator winding resistance $R_{ac}$ at an operating frequency $\omega$;

(b) sensing the current in the alternator winding to generate a signal that is proportional to the alternator current i;

(c) generating a signal representing a voltage v across a virtual capacitor by computing $v = L_{alt}\omega^2 \int i(dt)$ from the sensed current; and (d) subtracting the signal representing the voltage v from the voltage $V_{Internal}$ to generate a signal representing an alternator terminal voltage $V_T$; and (e) applying a signal representing the voltage $V_T$ to the controlling input of the pulse width modulator.

9. A method in accordance with claim 8 and further comprising controllably varying the value of the operating frequency $\omega$.

* * * * *